Jan. 22, 1963 R. HERMAN 3,074,662
MOTION PICTURE PROJECTOR DRIVE MECHANISM
Filed March 20, 1961 3 Sheets-Sheet 1

INVENTOR.
RAYMOND HERMAN
BY
*Albert M. Parker*
ATTORNEY.

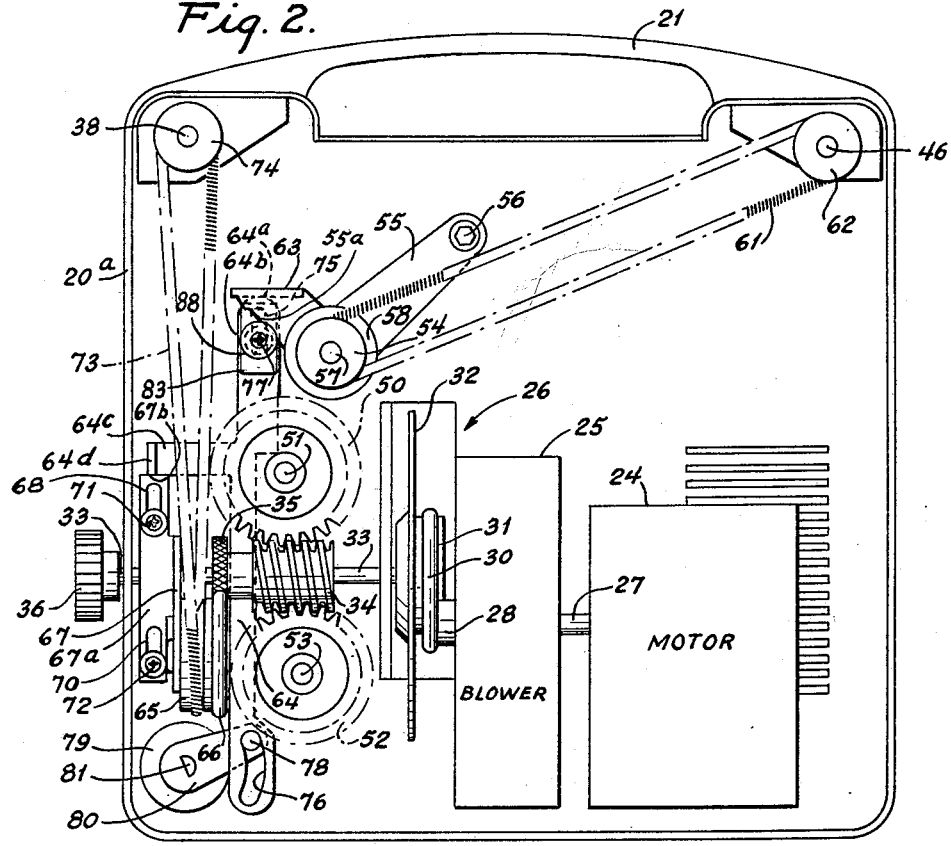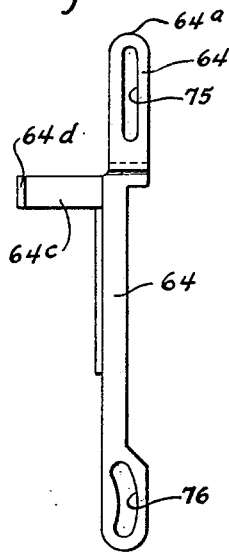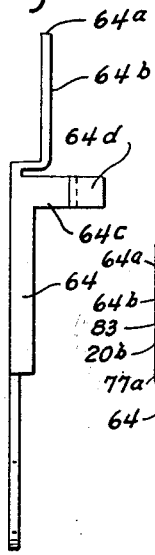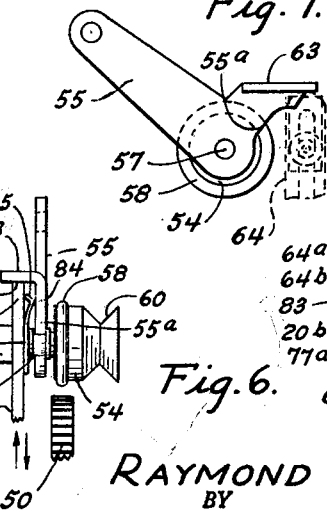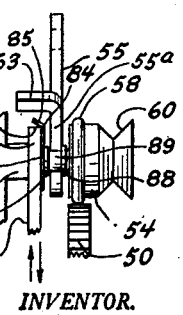

Jan. 22, 1963 R. HERMAN 3,074,662
MOTION PICTURE PROJECTOR DRIVE MECHANISM
Filed March 20, 1961 3 Sheets-Sheet 3
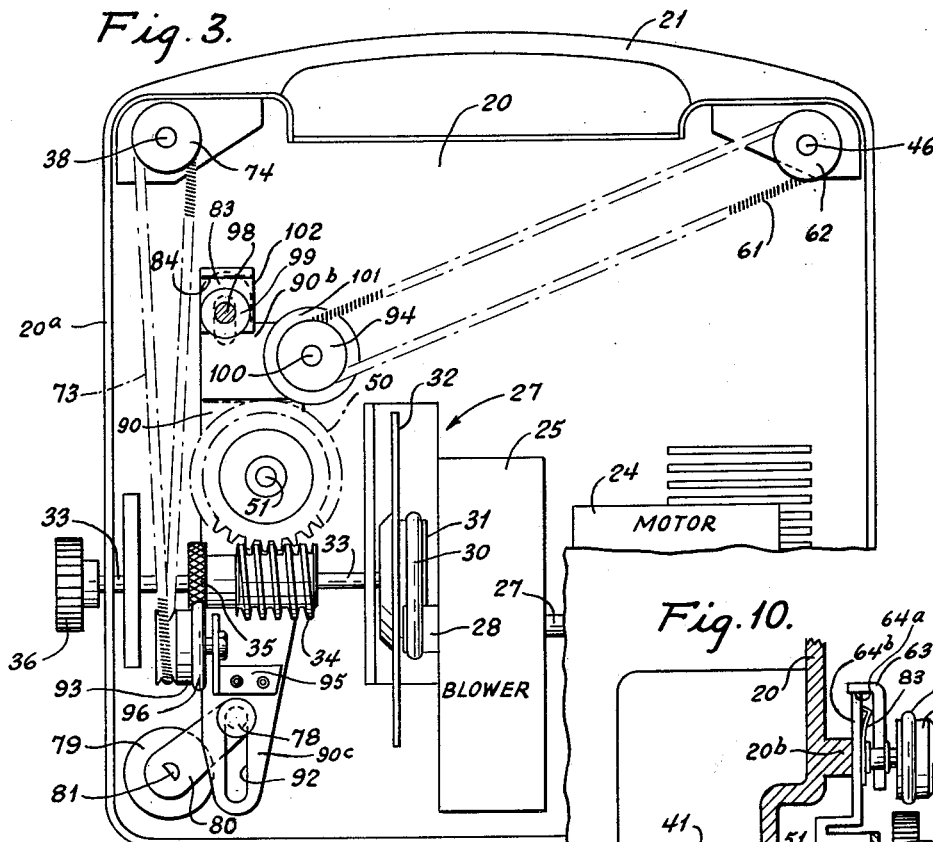
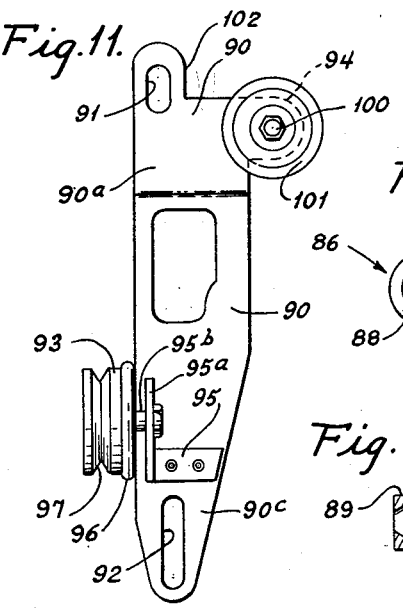
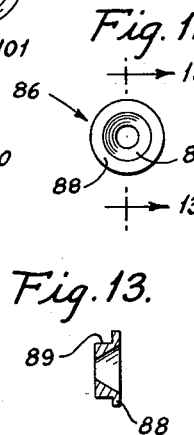
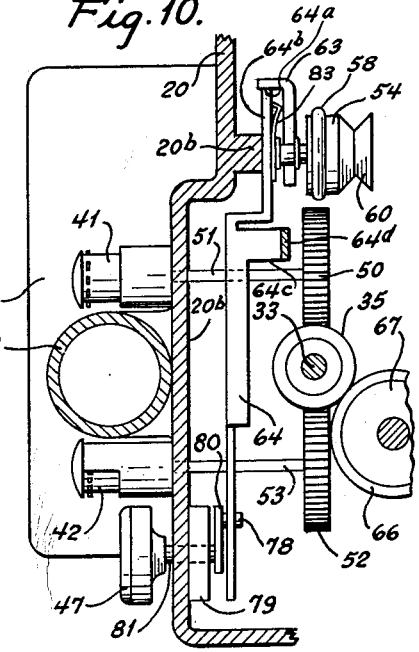
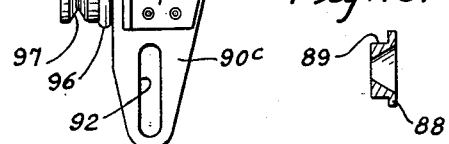
INVENTOR.
RAYMOND HERMAN
BY
*Albert M. Parker*
ATTORNEY.

United States Patent Office 3,074,662
Patented Jan. 22, 1963

3,074,662
MOTION PICTURE PROJECTOR DRIVE
MECHANISM
Raymond Herman, Brooklyn, N.Y., assignor to Richmond
Research Corporation, Richmond Hill, N.Y., a corporation of New York
Filed Mar. 20, 1961, Ser. No. 96,830
4 Claims. (Cl. 242—55.12)

This invention relates to drive mechanisms for motion picture projectors and is particularly concerned with simplification of such mechanisms for reversably transporting the film.

Motion picture projectors have in the past been complicated and expensive because of the large number of operating gears and control means which have been considered necessary for the transporting of the film through the film gate for projection and for rewinding the film after the picture has been shown. By proper positioning of parts and by causing various elements to perform dual functions, the present invention eliminates many of the mechanisms and gears previously used. Though simplified and made more economical the mechanism of the invention is foolproof and operates with full effectiveness. In addition, though the projection and rewind operations are normally accomplished with the motor running in the same direction, the mechanism can be operated in reverse by reversing the supply and take-up reels and reversing the motor.

The principal object of the invention is to provide greatly simplified film transporting mechanisms for motion picture projectors.

Another object is to provide such mechanisms which avoid a number of the disadvantages and limitations of prior art mechanisms.

Another object of the invention is to provide such a mechanism wherein various elements perform more than one function.

Still another object is to provide for reversing the movement of the film without changing the direction of the rotation of the motor.

A further object is to utilize the spring tension of the drive belts for effecting and maintaining engagement of various driving elements.

A further object is to provide for operation of the mechanism for both projection and rewind by means of a single control knob.

A still further object is to provide for taking the various drives from a single operating shaft.

For a better understanding of the present invention, together with other and further objects thereof, reference is made to the following description taken in connection with the accompanying drawings, in which drawings:

FIG. 2 is a view taken from the other side of the projector with the cover removed therefrom to show the drive mechanism inside the enclosing structure, in keeping with the preferred form of the invention.

FIG. 3 is a side view similar to FIG. 2 but showing an alternate drive mechanism.

FIG. 4 is a front elevation of the main control arm used in the FIG. 2 mechanism.

FIG. 5 is a side elevation thereof.

FIG. 6 is a fragmentary front view of the swingable arm plate and drive pulley for driving the take-up reel in accordance with the preferred form of the invention, showing the same out of drive position.

FIG. 6A is a view of the same in drive position.

FIG. 7 is a side view thereof.

FIG. 10 is a cross sectional view of the operating mechanism of FIG. 2 taken along line 10—10 of FIG. 1.

FIG. 11 is a front view of the main control arm of the FIG. 3 alternate.

FIG. 12 is a plan view of the shoulder washer used in various positions, and

FIG. 13 is a section on the line 13—13 of FIG. 12 through the center of the same.

Speaking generally, the motion picture projector drive mechanism of the invention includes a source of rotary power for transporting film from the supply reel, through the film gate for projection of the images thereon and then to the take-up reel. Reversely the film is rewound on the supply reel directly from the take-up reel. The drive for the various sprockets and pulleys used in feeding the film is all taken either directly or through intermediaries from a single shaft which, with the motor driving it, continues to rotate in the same direction for both feeding and rewinding of the film. Clutches as commonly employed are eliminated, gear and shaft peripheries are used instead for imparting the necessary drive and several of the elements perform dual functions which assists in simplification of the mechanism.

Figure 1:
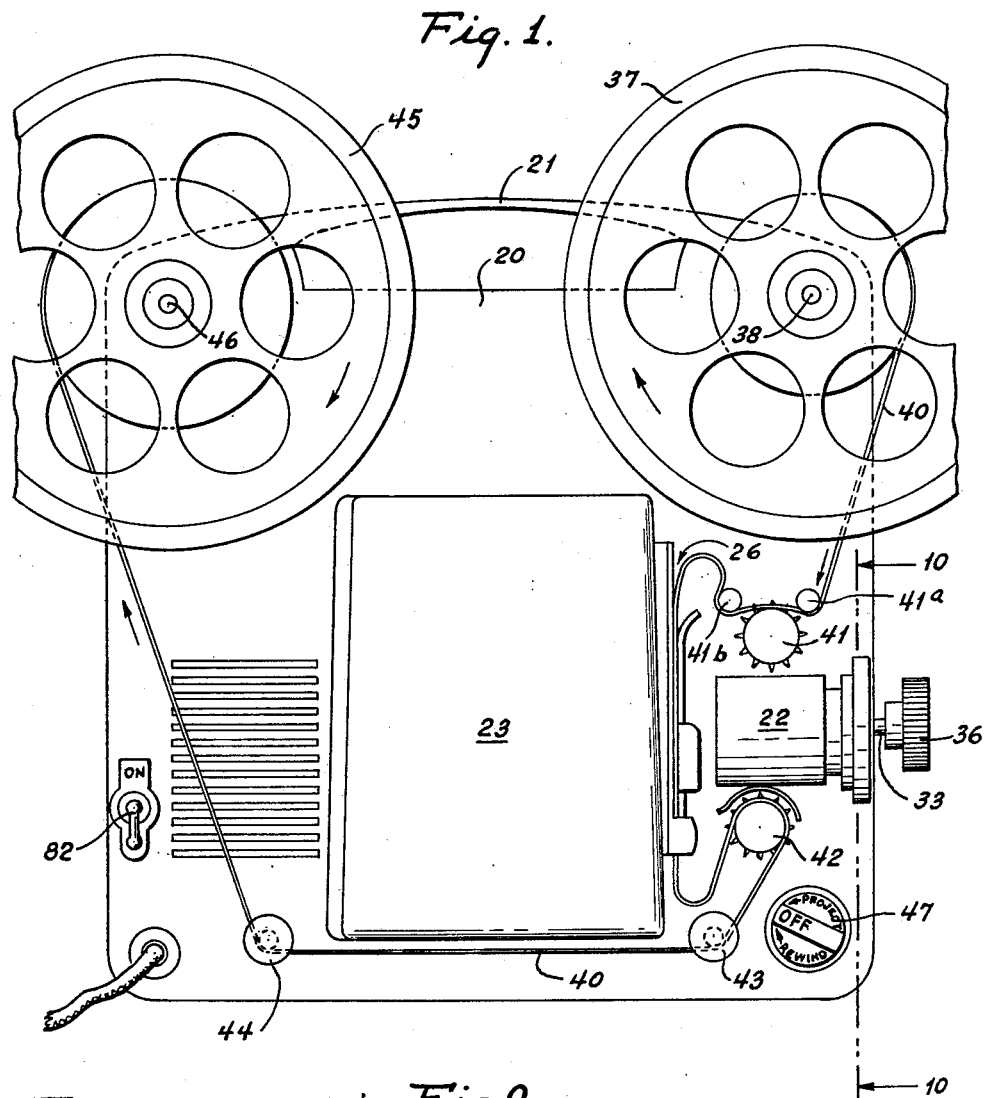
FIG. 1 is a view taken from one side of the projector, including the supply and take-up reels, with film passing from one of those reels to the other via the drive sprockets and film gate.

Referring now to FIGS. 1, 2, and 10, the film drive mechanism is largely carried by one side wall 20 of a housing, the other parts of which are omitted so that the mechanism can be fully exposed. The wall 20 may advantageously be a metal casting. The wall 20 has an opening therethrough adjacent its top to provide a carrying handle 21. On one side the wall 20 carries an extension 22 for housing the lens tube and another, 23, serving as the lamp house. The motor 24 and a blower 25 are mounted on the other side of the wall 20. The film gate 26 is mounted on the front of the lamp house 23, there being room inside the lamp house behind the film gate for the intermittent feed and shutter to operate. Parts that are conventional are neither shown nor described in detail.

The motor 24 is coupled to the blower 25 by means of a shaft 27 which projects through the blower. Its projecting portion carries a small pulley 28 which receives a suitably resilient belt 30. The belt 30 is engaged over and turns a larger pulley 31 forming part of the hub of the sector shutter 32. The sector shutter 32 is mounted on a shaft 33, which extends out through the front flange 20a of the wall 20. A worm screw 34 advantageously made of a tough plastic material is secured to the shaft 33 to turn therewith. A forward extension of the worm 34 provides a contact with a drive pulley as will appear hereinafter. Where the shaft 33 extends out beyond the flange 20a it carries a knob 36 which may be used to turn the shaft 33 by hand while the film is being threaded over the drive sprockets and through the film gate ready for the projection operation.

By reference to FIG. 1 it will be seen that a supply reel 37 for the film to be shown is mounted at the upper right hand corner of the wall 20. This mounting is effected by means of a shaft 38 which is suitably journaled with respect to the wall 20 at that upper right hand corner.

The reel 37 and the shaft 38 are keyed to turn together as is well known in the art.

Considering now the mechanisms on the face of the wall 20 as seen in FIG. 1, from the standpoint of travel of the film 40 in forward or projection direction, the first element engaged by the film is a continuous motion sprocket 41 mounted to extend out laterally just above the lens holder 22. The film is guided over the sprocket 41 and held thereagainst by guide studs 41a and 41b. Next the film passes into the film gate 26 where it is engaged by suitable intermittent mechanism, (not shown), and where the light from the lamp within the housing 23 passes through it to project the images thereon by means of the lens system 22.

On emerging from the film gate 26 the film passes up around another continuous motion sprocket 42 and from there passes over idler rollers 43 and 44 and in so doing passes to the rear of the projector housing beneath the lamp house 23. From the idler roller 44 the film is taken up on the driven takeup reel 45 which in turn is mounted to turn with the shaft 16. The stud shaft 46 is carried by the wall 20 and is journaled in the inner left hand corner thereof as viewed in FIG. 1. From this showing it is believed that the construction and operation of this side of the apparatus, when used for projection, will be obvious to anyone skilled in the art.

For rewinding, the film is removed from the sprocket 41, from the film gate 26, from the sprocket 42 and from the idler rollers 43 and 44. Then it is brought directly across from the take-up reel to the supply reel and the supply reel is turned while the take-up reel runs free in order to rewind the film onto the supply reel.

The control knob 47 aids in the simplification of the apparatus, for it not only actuates an electrical switch for turning the motor on and off, but it also acts to move the control arm of the drive mechanism mechanically between forward and reverse positions. The detail of this will appear hereinafter.

Referring now to FIGS. 2 and 4–10 for the details of the mechanism of the preferred form of the invention, the worm screw 34 will be seen to be meshed with a toothed wheel 50 which is mounted on a shaft 51 extending transversely with respect to the lower portion 20b of the wall 20. This shaft as seen from FIG. 10 also forms the shaft for the sprocket 41. Thus since the gear 50 is secured to the shaft 51 to turn the same, the drive motion imparted to the gear 50 by the worm 35 serves to drive the sprocket wheel 41.

A toothed wheel 52, in all respects similar to the toothed wheel 50, is likewise mounted axially of the shaft 33 beneath the worm 34 and in turning engagement therewith. The wheel 52 is carried by a shaft 53 which is journaled in the wall section 20b and serves as the mounting shaft for the sprocket 42. Again the toothed wheel 52 and the sprocket 42 are secured to the shafts 53 to turn therewith. Thus when the worm 34 is turned, the sprockets 41 and 42 turn in opposite directions but at the same speed.

The toothed wheels or gears 50, 52, are preferably formed of one of the tough plastic materials such as nylon or Mylar from which they can be molded, or cast, directly.

The drive of the take-up shaft 46 is effected by means of a pulley 54 mounted at the apex of an L-shaped arm 55. The upper end of the longer leg of this arm is swingably mounted on the wall 20 by means of a bolt 56 secured in the wall 20 and carrying a shoulder washer on which the arm 55 is freely swingable. The pulley 54 is mounted to turn on the shaft 57 and motion is transmitted between the shaft 57 and the shaft 46 by means of a belt 61 passing over the pulley 54 and also over a similar pulley 62 secured to the take-up shaft 46. Preferably this belt is of a helical spring type for it must provide a drive which part of the time needs to slip to a certain extent, but, besides these functions, the belt 61 performs another important one.

From the showing in FIG. 2 it will be apparent that the direction of the line between the mounting pivot 56 and the pulley shaft 57 is such that as the spring belt 61 tends to pull towards the shaft 46 it will swing the arm 55 about the mounting 56 and thus cause the pulley 54 to swing downwardly towards the toothed wheel 50. By referring to FIGS. 6 and 10 it will be seen that the pulley 54 is not only provided with a V-shaped groove 60 for receiving the belt 61, but it also carries a peripheral band 58 of hard resilient material in the form of an O-ring seated in a recess in the hub of the pulley. The purpose of this member 58 is to receive the drive from the gear wheel 50 and the parts are accordingly arranged so that the ring 58 is aligned with the periphery of the gear wheel 50. Thus if the arm 55 is free to swing downwardly under the resilient action of the spring belt 61, the ring 58 will come into engagement with the gear wheel 50 and will be driven thereby. This, then, is the manner by which the stud shaft 46 of the take-up pulley is driven.

Though the belt 61 has been indicated as preferably being a long helical steel spring, it is of course understood that it could be a resilient member of some other type. It must be kept in mind, however, that this drive must provide for slippage since the linear speed of the film during take-up remains the same while the periphery of the coil of the film on the take-up pulley remains constantly increasing in radius.

During the rewinding operation it is of course essential that the drive ring 58 be kept out of engagement with the face of the gear wheel 50. This is accomplished in the following manner. First, the short leg of the L-shaped arm 55 has its free end bent laterally at 63, as seen in FIGS. 2, 6, 6a and 10. This laterally bent portion 63 is moved upward for disengagement of the ring 58 from the gear wheel 50 by being engaged with the upper end 64a of the main control arm 64. The control arm 64 is basically an elongated strap of metal which has various offset and formed portions for the performance of a variety of functions. Its upper offset portion 64b is formed with a vertically extending elongated slot 75 while a portion adjacent its bottom is provided with an arcuate elongated slot 76. These slots enable the vertical slidable movement of the member 64 when it is suitably mounted on and with respect to the wall 20.

Just below its off-set upper portion the arm 64 has a laterally extending projection 64c which terminates in a right angled portion 64d for purposes which will shortly appear.

Figures 8, 9:
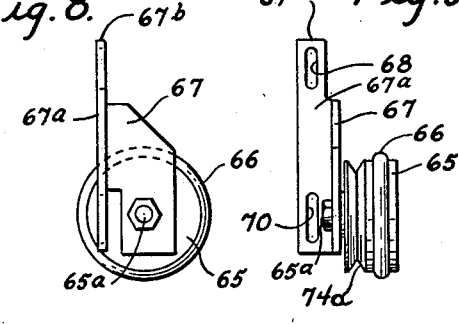
FIG. 8 is a front view of the other drive pulley with its mounting.
FIG. 9 is a side view thereof.

Referring now to FIGS. 8 and 9, it will be seen that a second drive pulley 65 carrying a resilient drive ring 66 and a V drive slot 74a is pivotally mounted at 65a on a bracket 67. This bracket 67 has a mounting portion 67a extending at right angles to the portion carrying the roller 65 and this mounting portion 67a has upper and lower elongated slots 68 and 70 for the slidable mounting of this bracket with respect to the wall 20. This mounting, as seen in FIG. 2, is by means of suitable studs 71 and 72 so positioned that the bracket has substantial vertical sliding movement.

It is also to be noted from the FIG. 2 showing, and as well somewhat from the showing in FIG. 10, that the drive ring 66 carried by the pulley 65 is mounted in alignment with the knurled drive member 35 which extends from and turns with the worm 34. From the showing in FIGS. 2 and 10 it will be apparent that movement of the ring 66 into and out of engagement with the member 35 is effected by moving the bracket 67 and hence the shaft 65a of the pulley 65 vertically. Furthermore, it will be seen from FIG. 2 that the rewind drive belt 73 extends from the slot in the pulley 65 up over the drive pulley 74 for the rewind shaft 38. Inasmuch as this drive belt 73 is preferably a resilient spring-like member the same as the belt 61, it will be constantly tending to hold the bracket upward in the FIG. 2 position so that the drive ring 66 will be in contact with the friction surface 35 and thus be driven when the shaft 33 turns.

With regard to the take-up and rewind, it is first to be noted that the upper portion 64b of the control arm is slidably mounted with respect to the wall 20 by a bolt 77 whose shank is slidably received on the shank of a collar washer riding within the slot 75. At the lower end of the arm 64 the arcuate slot 76 receives the pin 78 carried at the outer end of a short swinging arm 80 whose inner end is keyed to the inwardly projecting portion 81 of the actuating shaft 47 of the control knob. This shaft 81 extends through the electric switch 79. This switch serves in its two extreme positions to close the circuit for the motor 24, in each instance causing the motor to rotate in the same direction. In the intermediate position of the control knob 47 the switch is off and the motor will not run.

From the relationship of the pin 78 to the slot 76 it will be seen that as the arm 80 is swung from one extreme position to the other, the control arm 64 is moved upwardly to the position shown in FIG. 2, or moved downwardly so that the upper end 64a takes the position seen in FIG. 6A. In the upper position the drive ring 58 is moved away from the periphery of the gear wheel 50 so that no drive will be imparted to the belt 61 by this means. However, this being the rewind position the film being pulled off the take-up reel will, of course, cause the stud shaft 46 to turn, which it can freely do.

With the control arm 64 in its uppermost position, the extension 64d of the lateral arm 64c which overlies the upper end of the sliding bracket 67 will be out of the way so that the bracket 67 can slide to its uppermost position. This sliding is caused by the resilient action of the belt 73 which thus pulls the drive ring 66 into engagement with the knurled friction surface 35. Thus in this position drive will be imparted from the surface 35 to the ring 66, turning the belt 73, the rewind pulley 74 and the rewind shaft 38. The shafts 51 and 53 will turn at all times, thus rotating the sprockets 41 and 42, but so long as the film is not in engagement with them this action is of no consequence.

To effect the take-up the arm 80 is swung downwardly, thus drawing the main control arm 64 downwardly, retracting the end 64a from beneath the ledge 63 and leaving the arm 55 free to swing a short distance about the pivot 56. This swinging is brought about by the resilient action of the belt 61 which pulls the drive ring 58 into engagement with the periphery of the gear wheel 50. In this position the bracket 67 has been pushed downwardly by the angled portion 64d, pushing down on the top 67b of the bracket portion 67a and overcoming the upward action of the spring belt 73. Thus, the rewind has been disengaged, and the sprockets 51 and 53 are turning so the film will be fed for projection purposes.

Before leaving this part of the mechanism, two small but important elements thereof call for consideration. One of these is the spring detent 83 located in front of the upper portion of offset part 64b of the main control arm. The other is the shoulder washers 86 shown per se in FIGS. 12 and 13 which are utilized in a number of positions in the mechanism.

The spring 83 has a flat body portion which lies against the outer surface of the control arm portion 64b and is held thereagainst in sliding relationship by means of a washer 77a carried by the bolt 77 which passes through the slot 75 and is secured in the boss 20b. Preferably, the washer 77a carries a collar which also passes through the spring 83 and fits the slot 75 in a slidable relationship.

Adjacent its upper end, the spring 83 is bent laterally at 84 to provide a laterally extending detent portion 85. The position of this bend with regard to the longitudinal extent of the spring is such that when the main control arm 64 is moved to its downmost position, as seen in FIG. 6A, the bend 84 will come at the upper end 64a of the control arm and the detent portion 85 will lie across that upper end. Conversely, when the main control arm 64 is in its uppermost position the spring will have been bent outwardly between its portions 83 and the bend 84, as seen in FIG. 6, so that the end of the detent portion 85 will now ride up on the outer face of the portion 64b below the upper end 64a thereof. The spring 83 serves to at least assist in holding the main control arm in its set position, whether that be the upward or downward one. In the downward position the action is more positive since the detent portion 85 lies across the end 64a and thus overcomes the possibility that by the vibration action of the mechanism the main control arm might tend to ride up under the action of the spring 73 and thus connect the rewind instead of the take-up. On the other hand, when the main control arm 64 is in its uppermost position, as seen at 63, the end edge of the detent 65 merely imposes a dragging action on the face of the portion 64b. The tendency of the main control arm to work down by vibratory action is not so great as in the reverse, but, to the extent it exists, it is checked by the drag action of the spring.

The bolt 77 also carries one of the collar washers 86 underneath its head and on top of the washer 77a. When so used the shoulder washer provides an annular channel between the underneath of its head 88 and the opposed washer 77a. This channel is just the width of the arm 55 and receives the recessed portion 55a of the arm 55 in all positions of the movement of that arm. The importance of this relationship will be apparent from the showing in FIGS. 6, 6A, and 10, for, by locking the arm 55 against lateral movement, the possibility of the pulley 54 moving laterally is precluded. Thus the drive ring 58 is always kept in proper alignment with the gear face 50.

Other uses of shoulder washers of the type detailed in FIGS. 12 and 13 are beneath the head of the bolts 71 and 72 where the collars of the washers serve for the walls of the slots 68 and 70 to ride on.

One other element of the preferred form of the mechanism to be considered is the toggle switch 82. This controls the lamp circuit in such a way that the lamp can only be turned on when the main control switch 47 is in either the take-up or rewind position. Unless the switch 82 is turned on, however, the lamp will not light though the film transporting mechanism as well as the blower can operate. Accordingly, when the film is being rewound the lamp can be shut off while the blower continues to operate.

To briefly restate the operation of the preferred form of the mechanism, most of which will have become apparent from the foregoing description, the first step would be to position a reel 37 of film to be shown on the stud shaft 38. Then the film 40 is threaded down across the sprocket 41, through the film gate 26 and over the sprocket 42, with proper intermediate loops, while turning the shaft 33 by hand by means of the knob 36. This feeding and hand turning is continued until the film can be engaged with the take-up reel 45 in known manner. Then the knob 47 is turned to the project position and the lamp is turned on by means of the switch 82. The turning of the control knob 47 not only closes the circuit to actuate the motor but also swings the arm 80 so that the studs 78 rides down to the bottom of the slot 76 in the main control arm 64, moves that arm down to a certain extent and enables the spring belt 61 to go into action to swing the arm 55 downwardly about its pivot 56 so that the drive ring 58 is brought and held in contact with the periphery of the gear 50. With the motor going the shaft 33 will be rotating, thus turning the worm 34 which turns both the gears 50 and 52. Hence, not only will the take-up reel 45 be driven in the manner needed to take up the film being drawn from the supply reel, but, at the same time of course, the shafts 51 and 53 will be turned thereby driving the sprockets 41 and 42. The intermittent mechanism, not shown, would preferably be of the claw type driven from a cam face on the forward hub of the shutter. Since the main control arm 64 is in its downward position the drive ring 66 will be out of contact with the knurled drive member 35 and will be held in that disengaged position not only by means of the studs 78 but also by the action of the spring detent 85.

When the projection has been completed and it is desired to rewind the film back onto the supply reel, the mechanism is stopped momentarily by turning the control knob 47 to the off position which, at the same time, turns off the light. However, the toggle switch 82 must be thrown to the off position if it is desired to have the light out while the rewinding proceeds. To effect the rewinding, the film is brought directly across from the take-up reel 45 to the supply reel 37 and secured to the same so it will wind up thereon. Then the control knob 47 is moved to the rewind position. This turns on the motor switch for the motor to turn in the same direction and the stud 78 on reaching the upper end of the slot 76 pushes the main control arm 64 upwardly until the spring detent 85 snaps back from the end 64a to engage the surface of the portion 64b. The bracket 67 is urged upwardly at the same time by the action of the spring belt 73 so, while the drive ring 58 is being moved away from the periphery of the gear 50, the drive ring 66 is brought in contact with the knurled surface 35. The rewind, accordingly, proceeds at a higher speed than that of the take-up until all of the film is wound back on the supply reel.

Though the sprockets 41 and 42 will be turning and the intermittent mechanism will be operating as well during the rewind, this is of no consequence. Likewise, the pulley 54 will be rotating, but it is running free. It is important to note here that the spring belts in the form of the mechanism just described, not only serve to drive the shafts carrying the reels, but also serve to urge the respective drives into their operative positions and to maintain them there by the spring action of the belts. Then, again, the spring member 83 acts in the two positions of the main control arm to keep the mechanism in the position in which it is set. The shutter shaft 33 likewise serves as the drive shaft for a number of different elements of the mechanism as well as the means by which the mechanism is turned by hand for the threading of the film. Then, again, the control knob 47 and its shaft 81 act both to control the operation of the electric motor as well as to actuate the main control arm. Accordingly, a compact and simple mechanism results made up of a minimum of parts and made up of inexpensive parts so that the whole apparatus can be marketed at a low price.

Another thing to be noted is that the mechanism is so formed that it can be run in reverse direction if desired, i.e., the motor can be run in the opposite direction from that of the foregoing description, whereupon the present supply reel acts as the take-up reel and vice versa. This is achievable by simple electrical switching well known in the art and the detail of which need not be gone into here.

A somewhat modified mechanism in accordance with the invention is shown in FIGS. 3 and 11. Here the motor 24, the blower 25, the main drive shaft 33 and the drive for the same through the shutter, as well as the knob 36 for manual actuation, are the same as described in the form of FIGS. 1 and 2, so the same reference characters are applied to these parts and their intermediaries. Likewise the worm gear 34 and the knurled friction wheel 35 are formed out of the same tough plastic member and are secured to the shaft 33 in the same way. The shafts for the take-up and supply reels and the pulleys for driving those shafts, as well as the belts for imparting that drive, are also the same as indicated by similarity of reference characters. The main control arm, however, is different and is operable in a somewhat different manner. Furthermore, though the gear wheel 50 mounted on the shaft 51 is engaged by the worm gear 34 and driven by the same, so that it drives a sprocket 41 on the opposite side of the side wall 20, the other gear wheel driving the lower sprocket as shown in the preferred form is omitted from the FIG. 3 modification. However, the take-up reel can take up the film emerging from the film gate without the necessity of the intermittent motion being restored to continuous motion.

One important difference in the modified form is that the main control arm 90 is a larger plate-like member than the arm 64 and it has the driving pulleys for effecting the drive for the take-up and supply shafts affixed directly to it. First, it is to be noted, however, that its upper offset portion 90a has an upwardly extending projection in its left hand upper corner which is slotted at 91 in a vertically extending slot of shorter extent than that of the comparable slot in the preferred form. Additionally, this offset portion 90a has a projecting portion 90b extending out to the right on which the driving pulley 94 is mounted for rotation on a shaft 100 suitably secured to that projecting portion. This pulley is equipped with a resilient drive ring 101 in the form of an O ring received in a suitable recess in the pulley. The position of the pulley 94 is such that when the control arm 90 is in its downward position the periphery of the ring 101 will be in engagement with the periphery of the gear 50 and be driven thereby.

The lower end 90c of the arm 90 is formed with a straight vertically extending slot 92 therein which receives the laterally extending pin 78 carried at the end of the arm 80 as in the previous form. Obviously, however, the motion imparted to the control arm 90 by the swinging of the arm 80 will have both a horizontal, as well as a vertical, component due to the arc through which the pin 78 swings. Hence, as the pin 78 swings from one extreme position to the other it will swing the arm 90 to the right as viewed in FIG. 3 and then back again, as well as causing a vertical movement through its action at the ends of the slot 92.

A bracket 95 is secured to the lower portion 90c of the control arm just above the upper end of the slot 92 and its right angled portion 95a carries a shaft 95b on which the rewind reel drive pulley 93 is mounted. Again this pulley has a resilient O ring driving member 96 mounted thereon and is formed with a V-shaped recess 97 for reception of the spring belt 73. Obviously the pulley 93, like the pulley 94, is carried directly by the main control arm 90 and bears a fixed relationship with respect thereto. In addition to this, the movement of the pulleys 93 and 94 to engage and disengage them from their driving members is effected in considerably different manner from that in which their counterparts in the preferred form are actuated. The movement is a positive mechanical one brought about by the action of the control knob 47 and the swinging of the arm 80 as well as the engagement of the pin 78 in the slot 92.

Assuming then that the mechanism is in the position shown in FIG. 3, which happens to be the rewind position, when the driving ring 96 is in engagement with the knurled surface 35 of the driving member therefor, the main control arm 90 will be in its uppermost position and the driving ring 101 of the pulley 94 will be out of engagement with the gear 50. To reverse this condition, the arm 80 is swung downwardly and when it reaches the midpoint of its swing it will have swung the arm 90 to the right, as viewed in FIG. 3, to such an extent that the drive ring 96 will have been moved out of engagement with the knurled drive member 35 by being displaced to the right of the same as viewed in FIG. 3. Then, on continued downward movement of the arm 80 the main control arm will be moved downwardly so that at the end of the downward movement the ring 96 will be realigned with the knurled member 35 but will be lowered and offset out of contact with respect to the same. Thus the rewind drive will have been disconnected, but, at the same time, the drive for the take-up will have been brought into engagement since the same movement will put the drive ring 101 of the pulley 94 into engagement with the edge of gear 50. In this instance the resiliency of the belt 61 will have no effect on the driving connection, since the pulley 94 moves in a fixed path somewhat against the tension of the belt 61. With regard to the engagement of the ring 96 with the surface 35, this is effected positively by the action of the pin 78 against the upper end of the slot 92. Thus driving engagement is effected regardless of the intermediation of the spring belt 73, though that does exert a force tending to urge the pulley 93 upwardly.

The slot 91 in the projection 102 rides on the shank of a bolt 98 which passes through the same and is suitably secured in a boss extending outwardly from the wall 20. The bolt 98 carries a washer 99 and this in turn holds a detent spring 83 in against the face of the projecting portion 102 in the same manner as the spring 83 is held in place in the preferred form. Likewise, the spring being the same, it is bent at 84 into an upper detent portion 85. This detent portion extends in over the top of the projection 102 to help hold the arm 90 in its downmost position when the arm is moved into that position. Reversely, the end edge of the detent engages the front face of the portion 102 to help hold the arm in its upward extending position when it has been moved there.

From the foregoing description of the apparatus it is believed that it is obvious that when the control button is turned into a position where the stud 78 is in its downmost location, the arm 90 will be held downward, the take-up drive pulley 94 will have its ring 101 driven by the gear 50 and the take-up driven pulley 62 will thus be driven. Reversely, when the arm 80 is swung to its uppermost position with the stud 78 at the upper end of the slot 92, the drive ring 101 will be disengaged but the drive ring 96 will be engaged with the surface 95. Here, then, the rewind action will be in effect.

In the accompanying drawing, and particularly in FIGS. 2, 10 and 3, the electric switch has been shown as positioned behind the lower ends of the respective control arms 64 and 90. This showing facilitates the understanding of the control arms and related mechanisms, though advantageously the positions of the switch 79 and the arms 64 and 90 could be reversed with the switch being suitably positioned at the inner end of the shaft 81 and being mounted on a suitable bracket extending across the bottom left hand corner of the casing. The arm 80 would then be mounted on the shaft 81 closely adjacent the wall portion 20b to swing between the switch and that wall. Likewise, at least the lower portions of the arms 64 and 90 would lie between the switch 79 and the wall portion 20b.

While the mechanisms and arrangements of the same shown in the accompanying drawing and described in the foregoing are believed to be adequately illustrative of the invention, it is of course to be understood that the invention is not to be interpreted as being limited thereby. Those skilled in the art may well be able to devise various modifications and revisions of the illustrative mechanisms once those are brought to their attention without, however, departing from the spirit and scope of the invention. It is, accordingly, to be understood that since certain changes may be made in the above construction and different embodiments in the invention could be made without departing from the scope thereof, it is intended that all matter contained in the above description or shown in the accompanying drawing shall be interpreted as illustrative and not in a limiting sense.

Having described my invention what I claim as new and desire to secure by Letters Patent is:

1. In motion picture drive mechanism, a casing providing a vertical wall, a main control arm slidably mounted for substantially vertical movement with respect to said wall, actuating means engaged with said control arm at one end thereof for actuating the same, drive means including a friction drive ring, said drive ring being positioned substantially transversely with respect to the path of movement of said control arm, a bracket slidably mounted on said wall for movement parallel to that of said main control arm, a drive pulley including a driving ring carried by said bracket and mounted for movement of said driving ring into and out of engagement with said friction drive ring on sliding movement of said bracket, a lateral arm carried by said control arm and formed for engagement with said bracket to move said bracket and said driving ring carried thereby out of engagement with said friction ring in one direction of movement of said control arm, a stud shaft for the winding up of film, a driven pulley carried by said stud shaft and a resilient drive belt interconnecting said driven pulley and said drive pulley for driving said driven pulley, and said resilient drive belt in the other direction of movement of said control arm serving by resilient action to slide said bracket into position to bring said driving ring of said drive pulley into driving engagement with said friction ring.

2. A motion picture projector drive mechanism comprising, motor means providing the power for transporting film from a supply reel to a take-up reel during a projecting operation and for transporting said film from the take-up reel to the supply reel during a rewind operation, a main drive shaft coupled to said motor means, a worm screw mounted on said shaft to turn therewith, a friction wheel secured to said shaft adjacent to said worm screw, a first gear wheel meshed with said worm screw and secured to a first sprocket wheel for moving film toward a projection plane, a second gear wheel also meshed with said worm screw and secured to a second sprocket wheel for moving film away from said projection plane, a first drive pulley slidably mounted adjacent to said friction wheel for controlled engagement therewith, said first drive pulley being coupled to said supply reel by means of a first resilient belt, said first belt arranged to exert a force on said pulley to move it toward engagement with the friction wheel, a second drive pulley rotatably mounted adjacent to said first gear wheel for controlled engagement with the periphery thereof, said second pulley being coupled to the take-up reel by means of a second resilient belt, said second belt arranged to exert a force on said second drive pulley to move it toward engagement with said first gear wheel, and a control mechanism for moving said first and second drive pulleys out of engagement with said friction wheel and said first gear wheel, said control mechanism arranged to operate whereby one of said drive pulleys is permitted to move into said engagement at the same time the other of said drive pulleys is moved out of said engagement.

3. A motion picture projector drive mechanism comprising, a driving motor, a blower and a shutter driven by said motor, a main drive shaft having said shutter mounted adjacent one end thereof, manual means for turning said shaft mounted on the same adjacent the other end thereof, a worm gear and a friction drive ring fixedly mounted on said shaft intermediate said ends, a sprocket drive gear mounted in engagement with said worm gear for rotation thereby to turn a film feeding sprocket, a first pulley having a driving surface thereon and means for mounting said first pulley for movement of said driving surface into and out of engagement with the periphery of said sprocket drive gear, means carried by said first pulley for driving film winding means, a second pulley including a driving surface mounted for movement of said surface into and out of engagement with said friction drive ring and said second pulley including means for driving a second film winding means, means for moving the driving surface for said one of said pulleys out of engagement with the periphery of said gear while, concurrently therewith, enabling the driving surface of the second of said pulleys to come into engagement with the peripheral surface of said friction drive ring and vice versa, and unitary means for effecting said disengagements.

4. Mechanism as in claim 3, said driving motor being an electric motor and said unitary means including electric switch means for completing the circuit to said motor, for rotation of the same in the same direction, in the two extreme positions of said unitary means.

References Cited in the file of this patent
UNITED STATES PATENTS

| | | |
|---|---|---|
| 2,190,198 | Stechbart | Feb. 13, 1940 |
| 2,207,075 | Sperry | July 9, 1940 |
| 2,666,594 | Jungjohann | Jan. 19, 1954 |
| 2,675,973 | Reed et al. | Apr. 20, 1954 |
| 2,978,198 | Bierman | Apr. 4, 1961 |